United States Patent
Bara

[15] 3,671,045
[45] June 20, 1972

[54] RECORD CHANGER

[72] Inventor: Edward S. Bara, Elmwood Park, Ill.

[73] Assignee: Warwick Electronics Inc.

[22] Filed: Jan. 19, 1970

[21] Appl. No.: 3,887

[52] U.S. Cl. ............................ 274/10 R, 274/9 RA, 274/15
[51] Int. Cl. ................................ G11b 15/00, G11b 17/06
[58] Field of Search ............... 274/9 RA, 10 R, 14, 15 R; 340/174.1 C

[56] References Cited

UNITED STATES PATENTS

| | | | |
|---|---|---|---|
| 3,158,844 | 11/1964 | Bowdle | 340/174.1 C |
| 3,503,060 | 3/1970 | Goddard et al. | 340/174.1 C |
| 2,723,859 | 11/1955 | Stone | 274/14 |
| 3,503,615 | 3/1970 | Matsuda | 274/10 R |
| 2,325,708 | 8/1943 | Runge | 274/14 |

Primary Examiner—Leonard Forman
Assistant Examiner—Steven L. Stephan
Attorney—Hofgren, Wegner, Allen, Stellman & McCord

[57] ABSTRACT

A record changer having a manually operable mechanism for cuing a tone arm to place the tone arm at a desired set-down position on a record. Also, a record changer having settable structure for automatic repeat playing of a chosen band or passage selected at random between the beginning and end of the grooves of the record.

9 Claims, 8 Drawing Figures

RECORD CHANGER

CROSS REFERENCES TO RELATED APPLICATIONS

This application embodies improvements to the record changer shown in Reed et al. U.S. Pat. No. 3,394,938, granted July 30, 1968, and the disclosure therein is incorporated herein by reference.

BACKGROUND OF THE INVENTION

This invention pertains to record changers with manually operable structure for cuing the tone arm and with structure for repeat playing of a selected passage or band of a record.

The prior art known to the applicant includes Reed et al. U.S. Pat. No. 3,394,938, which discloses a commercial record changer providing for automatic playing of intermixed records, with the size of the record determined by record size sense mechanism for controlling the set-down position of the tone arm and with the changer including mechanism for shutting-off of the changer after playing of the last record. Added versatility is provided for such a record changer by the mechanism disclosed herein wherein the set-down position of the tone arm can be manually established through a cuing device and wherein mechanism is also provided for repeat playing of a selected passage or band of a record including the beginning and ending points thereof. The operation of such mechanism blocks the record changer from a normal record size-sense operation and from a last record shut-off operation.

SUMMARY

An object of this invention is to provide a new and improved record changer having provision for manual cuing of a tone arm.

Another object of the invention is to provide a record changer having new and improved mechanism for automatic, repeat playing of a chosen band or passage of a record selected at random.

Still another object of the invention is to provide a record changer with a tone arm cuing device having a manually movable member which functions as a rest for the tone arm and which also has movements in vertical and horizontal planes for causing corresponding movements of the tone arm and with structure provided for a controlled movement of the manual member upon release thereof for a controlled slow rate lowering of the tone arm onto a record.

An additional object of the invention is to provide a record changer wherein means are provided for controlling the set-down position of a tone arm at any random point on a record, including a control member movable with the tone arm and locked in a desired position to determine the set-down position for the tone arm and with means for locking out of operation the normal record size sense mechanism and the last record shut off mechanism.

A further object of the invention is to provide a record changer as defined in the preceding paragraph wherein the end of the passage or band to be played is determined by a settable member which is in circuit with an electromagnet for operating the velocity trip mechanism of the record changer with the settable member being operated by a manual member on the motorboard of the record changer. The settable member is variably positionable whereby a contact link carried by the mechanism associated with the tone arm engages the settable member to close the circuit to the electromagnet and actuate the velocity trip mechanism to move the record changer through a record change cycle as if the end of the record had been reached.

DESCRIPTION OF THE PREFERRED EMBODIMENT

The novel mechanisms disclosed herein are additions to a commercially available record changer, as shown in Reed et al. U.S. Pat. No. 3,394,938, referred to previously, and said patent may be referred to for a detailed description of the entire record changer. Insofar as necessary for an understanding of the novel mechanism added to such changer, reference has been made herein to record changer structure as shown in said patent. Structure corresponding to that shown in the patent has been given the same reference numeral as in the patent and a general description is given herein, followed by a detailed description of the novel mechanism added to the changer.

Figure 1:
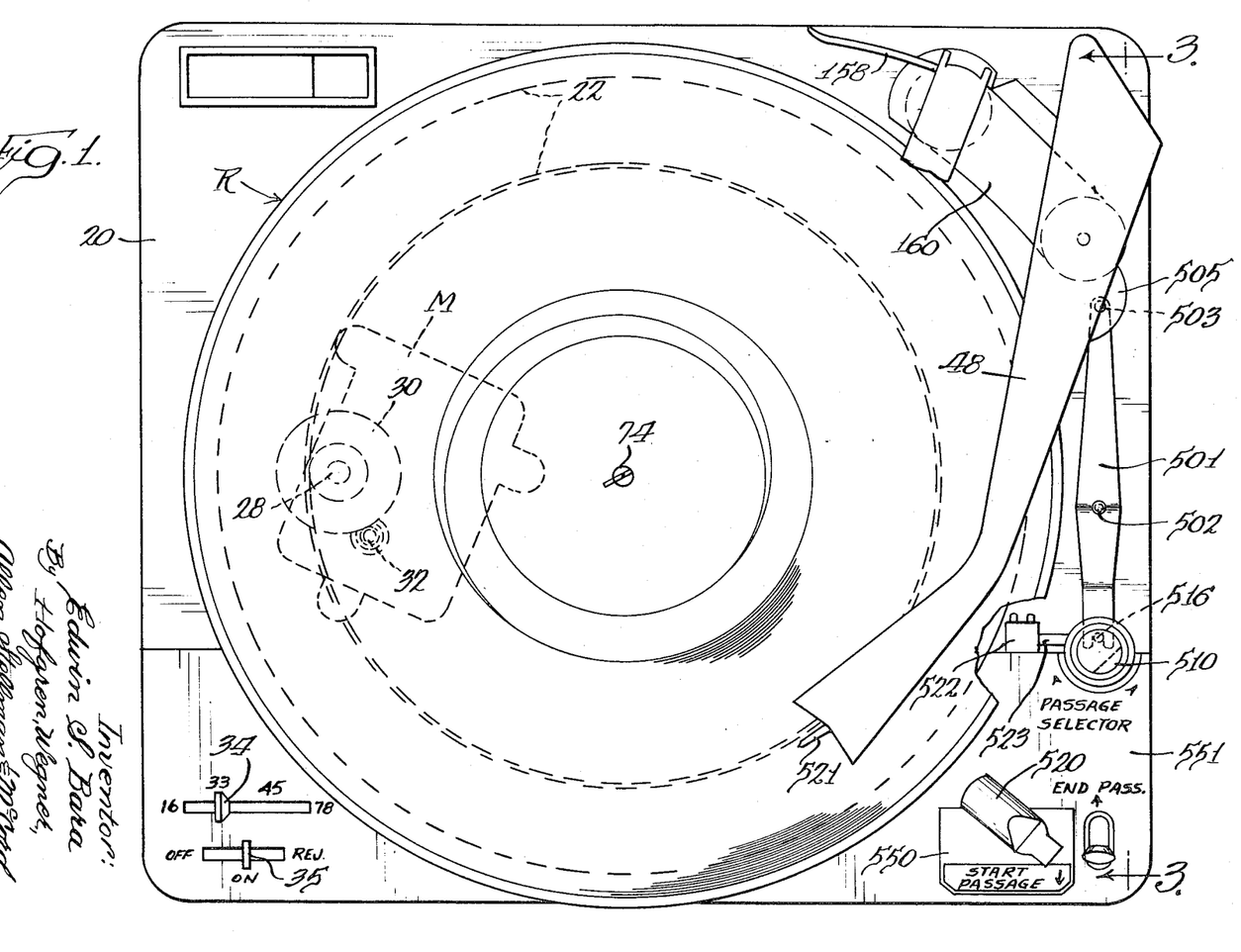
FIG. 1 is a plan view of the record player.

The record changer is shown generally in FIG. 1 and has a motorboard 20, mounting a turntable 22 for rotation thereon which is driven by a small diameter wheel 28 having a large diameter wheel 30 coaxial therewith and driven by an output shaft 32 of a drive motor M. The speed setting for the drive of the turntable is controlled by a speed selection lever 34 and the off and on and reject operation for the record changer is controlled by a selector lever 35.

A tone arm 48 is movably mounted at one corner of the motorboard for movement between an outward rest position and a variety of operative positions, with set-down positions determined by a record size sensing flag member 158 movably mounted within a housing 160. A center spindle 74 extends upwardly from the turntable for mounting a stack of records in a normal record changer operation and has suitable ejection mechanism for causing sequential movement of individual records to the turntable.

The record changer is caused to function through a record change cycle by a drive mechanism powered from the rotation of the turntable. The cycle is initiated by a velocity trip mechanism carried on a gear 80. The gear 80 is at the level of a gear 46 rotatable with the turntable and carries a velocity trip mechanism having a trip dog 84 pivoted on the gear which can move into position to be engaged by a lug 44 on the gear 46 to commence rotation of the gear 80 and bring teeth on the two gears into mesh, since there is a gap in the teeth on the gear 80. The velocity trip, as is well known, is operated by engagement with a tab 96 forming part of the trip mechanism engageable by an actuating arm 124 which is pivoted to a set-down cam 222 for the tone arm 48 at pivot 274.

When the gear 80 commences rotation, an eccentric pin 132 is caused to revolve and the pin operates in a slot in a rocker arm 136 which is moved through a complete cycle during one complete revolution of the gear 80. This rocker arm carries an actuating pin 154 which performs several functions, including in and out movement of the tone arm, as well as control of the size sense mechanism of the record changer. The actuating pin 154 coacts with a dog 226 which is normally spaced beneath the set-down cam 222 but, upon elevation of the tone arm lift pin 66 by a cam surface 272 on the end of the rocker arm 136, the dog 226 is elevated through compression of a spring 228 surrounding the lift pin to cause engagement of the dog with the set-down cam 222 whereby rotative movement of the dog, as caused by the actuating pin, results in corresponding rotation of the set-down cam 222 which is rotatively fixed to the tone arm 48.

The record changer also includes a set-down lever 204 which is bifurcated, having legs 206 and 208, with the lever being pivoted on a pin 138 fixed to the motorboard. The set-down lever is urged in a counterclockwise direction, as viewed in FIG. 2, by a spring 212 connected between the lever and the motorboard. The set-down lever coacts with the set-down cam 222 and with a selector cam 184 which is movable to a particular position as determined by the size of a record to be played. The selector cam is held in the position shown in FIG. 2 against the urging of the spring 194 by a lateral extension 218 of the lever arm 208 engaging a tab 188 on the selector cam. The position of the set-down lever 204 shown in FIG. 2 is established by a retractor lever 254 pivoted on the motorboard at 248 and engageable by the actuating pin 154 carried on the rocker arm 136.

Figure 2:
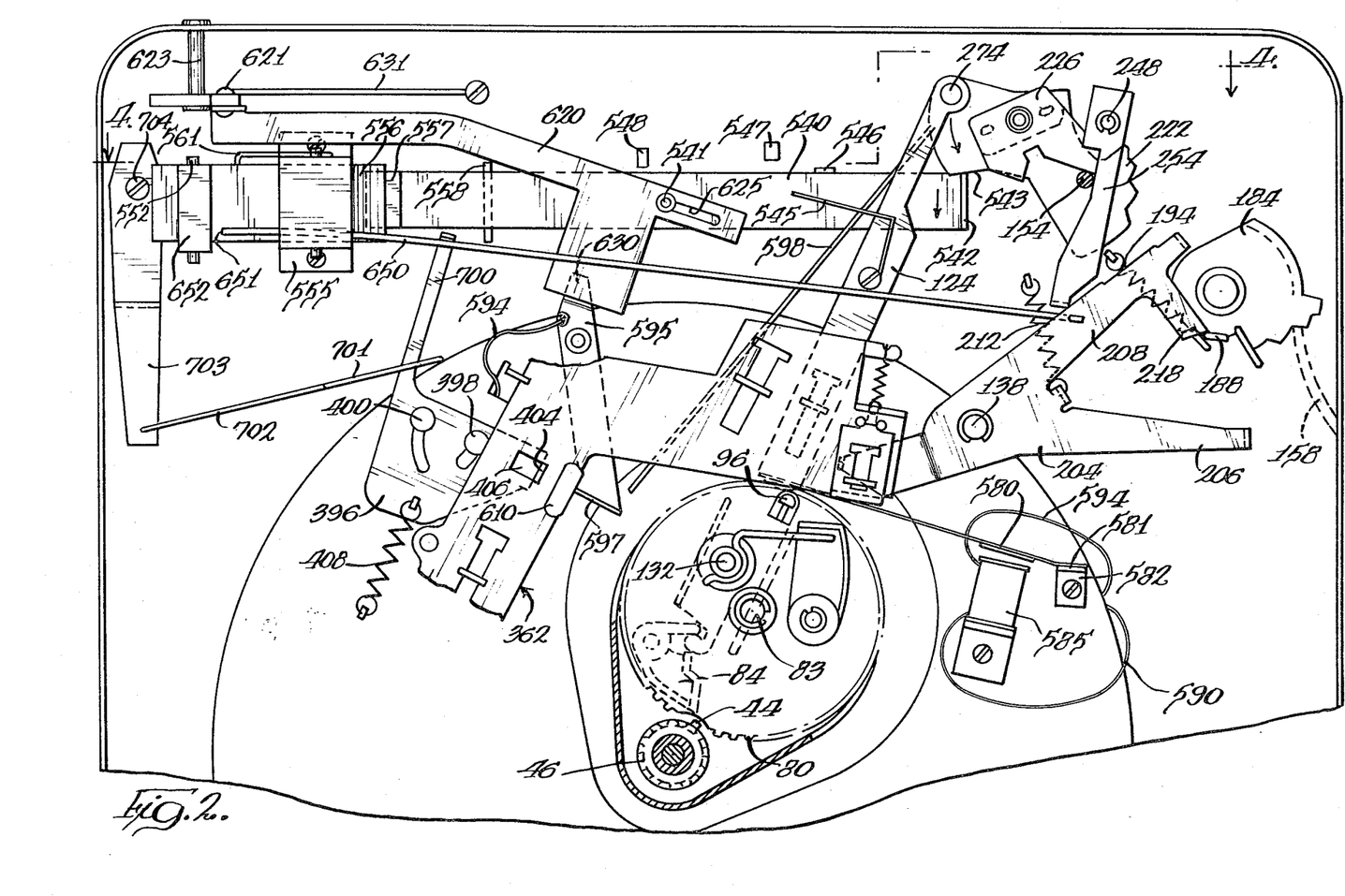
FIG. 2 is a bottom plan view of the right-hand portion of the record player, as viewed in FIG. 1.

The parts are positioned as shown in FIG. 2 as they would be during playing of a record. However during the record change cycle, the actuating pin 154 moves away from the retractor lever 254 to permit swinging of the set-down lever 204 and movement of the selector cam 184 to a record size sense position. These parts are eventually positioned dependent upon the particular size of record moved to the turntable. As will be noted more specifically later, if the set-down lever 204 is held in the position shown in FIG. 2, then the selector cam 184 is not free to rotate and is held inactive.

A reject slide 362 is movably mounted on the underside of the motorboard and has a return lever 396 associated therewith which is rotatably mounted by slots engaging pins 398 and 400 affixed to the motorboard and which has a tab 404 engageable in a slot 406 in the reject slide 362 whereby linear movement of the reject slide results in pivoting movement of the return lever 396. The return lever is urged to the position shown in FIG. 2 by a spring 408.

The foregoing describes the basic elements of the record changer necessary for an understanding of the novel mechanism added thereto and a complete description of the basic record changer can be found in the patent referred to above.

Because of the use of reference numerals corresponding to those found in the referred to patent, the added structure is referred to herein with reference numerals beginning at 501.

The novel mechanism relates to direct manual positioning of a tone arm and a stylus carried thereby to a desired position on a record supported on the turntable and with means for selecting a desired band or passage of a record in selecting both the beginning and end thereof and with automatic repeat of playing of the band or passage until the changer is placed into a reject operation which clears the settings of the mechanism determining the beginning and end of a passage. During these repeat operations, the record changer is caused to go through a normal record change cycle; however, there are no additional records supported on the spindle 74; therefore, the record on the turntable is the record which will have a particular band or passage repeated. Additionally, a normal record change cycle has the size select mechanism go through a cycle which would indicate the presence of a 7-inch record when no record is lowered to the turntable and, therefore, the novel mechanism includes structure for holding the size sense mechanism inactive.

The tone arm 48 can be manually positioned at a desired location on a record R without manual engagement of the tone arm. The mechanism for accomplishing this includes a slightly upwardly bent lever 501 (FIGS. 1 and 3) vertically rockably and horizontally pivotally mounted on the motorboard 20 by a pin 502 at the location of the bend in the lever. An upwardly extending pin 503 at one end of the lever 501 has a tip 504 of friction material which is engageable with a disc 505 on the underside of the tone arm when the lever is rocked to elevate the pin 503. The rocking and pivoting of the lever 501 is controlled from an actuator in the form of a tone arm rest member 510 having a support shelf 511 for the tone arm and which has a cylindrical body 512 mounted for vertical movement and rotation on an internal pin 515 with a loose fit therebetween and a silicone damping fluid added therebetween. The lower end of the body 512 has a downwardly extending pin 516 which engages in a slot in the end of the lever 501. With the tone arm 48 on the shelf 511, the actuator is depressed to rock the lever 501 and raise the pin 503 into engagement with the plate 505. Rotation of the actuator then pivots the lever 501 and causes corresponding rotation of the tone arm 48 to a desired position over a record. The actuator 510 is then released and it slowly elevates, as controlled by the silicone damping fluid. The elevating force is provided by the lowering movement of the tone arm and also by a spring 517 positioned under the lever. This controlled slow elevation of the actuator results in a slow, controlled lowering of the tone arm to engage the stylus with a record.

Figure 3:
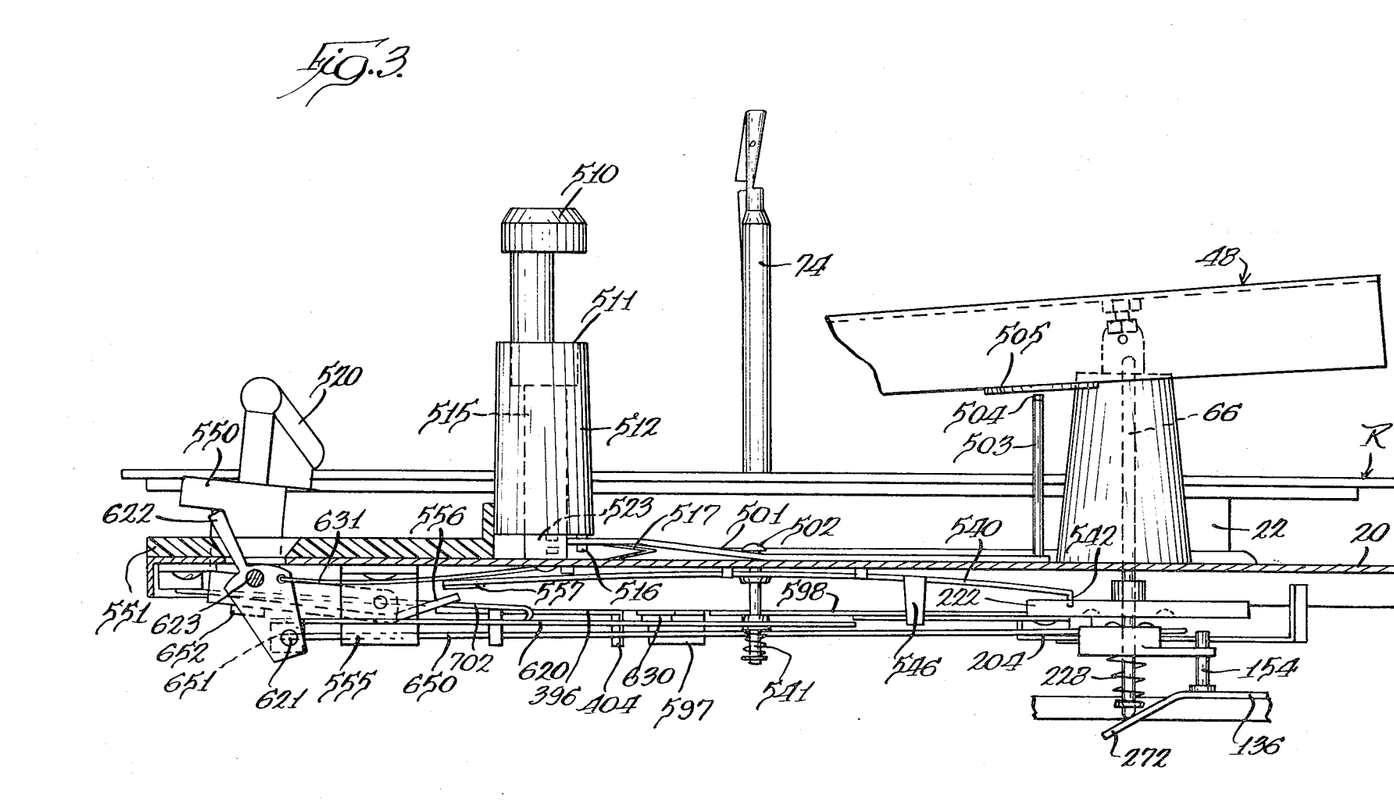
FIG. 3 is a vertical section, taken generally along the line 3—3 in FIG. 1 and with the changer in regular record playing operation.

To facilitate exact placement of the stylus onto a particular record groove, a light 520 is aimed toward the stylus and a plastic element 521 extending from the end of the tone arm 48 is illuminated by the light 520 to provide a clear visual indication of stylus location. The light 520 is controlled by a switch 522 in series circuit with the light and having switch contacts 523 positioned beneath the actuator body 512 to be brought into contact when the actuator is depressed.

The means for selecting the beginning of a band or passage on a record for repeat playing thereof is provided by structure which takes the place of the set-down lever 204 and the selector cam 184 which normally determine the normal set-down positions for different diameter records. The primary element substituted for this structure is a control lever 540 pivoted to a pin 541 extending downwardly from the motorboard. The control lever has a downturned end 542 for coaction with a surface 543 (FIG. 2) of the set-down cam 222. This control lever 540, when freed from restraint, is positioned, as shown in FIG. 3, wherein by its weight the end 542 is at a level of the set-down cam 222. As the set-down cam follows the rotation of the tone arm, the control lever 540 is also free to follow and does not block movement, since it is free to pivot about the pin 541. As the tone arm moves outwardly, the velocity trip actuating member 124 also moves outwardly and carries a spring 545 (FIG. 8) which engages a downturned tab 546 on the lever 540 and carries the lever outwardly against a stop 547 fixed to the motorboard. A stop 548 on the other side of the pivot 541 limits the swinging of the control lever 540 in the opposite direction.

From the foregoing, it will be seen that the control lever 540 rotationally follows the position of the tone arm and does not interfere with tone arm movement. In the event it is desired to repeat play a certain passage, the selection of passage beginning is accomplished by depressing a block 550 which carries the light 520 and which extends through an opening in a panel 551 mounted on the motorboard as well as an opening in the motorboard. Block 550, at its lower end, is pivoted by a pin 552 to a lever 553 pivoted by a pin 554 to a downwardly extending bracket 555. An opposite end 556 of the lever underlies an end 557 of the control lever 540 and is normally spaced therefrom, as shown in FIG. 3. Depression of the block 550 brings ends 556 and 557 into contact and lifts the end 557 of the control lever whereby the control lever 540 is brought into engagement with an abutment 558 to lock the control lever and flex the control lever which lifts the control end 542 out of the path of the set-down cam 222 during normal movement of the tone arm but which is in the path of the set-down cam when the tone arm is being moved in a record change cycle.

When the control lever 540 is free for movement, it follows the set-down cam 222. When the block 550 is depressed, the control lever 540 is held against further rotation and the control lever end 542 is lifted out of the plane of the set-down cam 222 so that the tone arm can move a further distance in toward the center of the record. This set-down position signal is retained, however, by the locked control lever 540. In the next record change cycle, the set-down cam 222 will be elevated and will be positioned beneath the end 542 of the control lever 540; therefore, the lever has sufficient upward flexibility to permit upward movement of the set-down cam 222. The set-down cam rotates as the tone arm moves outwardly and the set-down cam will move to a position past the end 542 of the control lever whereby said end 542 can move back to its locked elevation and lie in the plane of the surface 543 on the set-down cam. As the change cycle continues, the tone arm and set-down cam are moved inwardly and this movement stops when surface 543 engages the end 542 of the control lever. As a final step in the record change cycle, the set-down cam 222 is lowered and, thus, is beneath the end 542 of the control lever and the set-down cam and tone arm are then free to move and follow the record grooves.

The block 550 is held in locked position by a notch 560 therein engaging an edge of the notch in the motorboard. A push of the block 550 toward the right, as viewed in FIG. 4, releases this catch relation and permits upward movement of the block 550 to an inactive position. The block 550 is urged to this position by a torsion spring 561, connected to the lever 553.

With the foregoing structure, each time the tone arm moves inwardly in a record change cycle, a particular beginning point of a record, either the beginning of a particular band or a particular passage, can be repeated.

Figure 6:
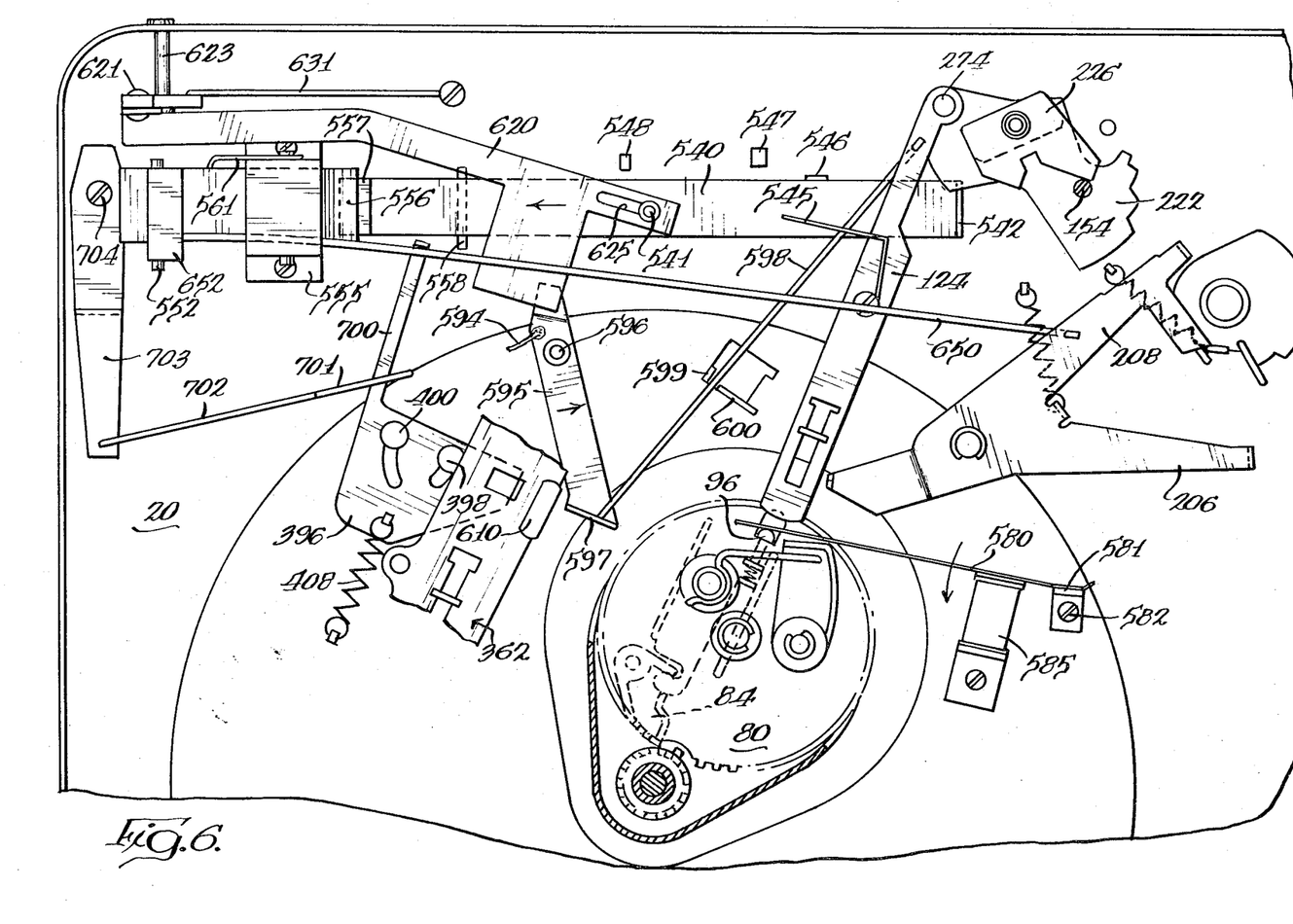
FIG. 6 is a view, similar to FIG. 2 and showing the parts positioned for end-of-passage play operation.

The novel mechanism disclosed herein also includes structure for determining the end of a particular band or passage to be played, with an automatic repeat of this termination. This function is accomplished by actuation of the velocity trip mechanism to cause beginning of a conventional record change cycle but as modified because of the control of the beginning of the passage or band selection, as previously described. This mechanism includes structure for actuating the tab 96 of the velocity trip mechanism and specifically a pivoted, magnetic-responsive leaf spring lever 580 having an end 581 mounting the lever to a tab 582 secured to the motorboard. The lever 580 is normally positioned, as shown in FIG. 2, out of contact with the velocity trip tab 96, but can be moved to the position of FIG. 6 where it has shifted the tab 96. This movement is caused by a motor in the form of electromagnet 585 mounted to the underside of the motorboard. Energization of the electromagnet 585 causes beginning of a record change cycle by actuation of the velocity trip mechanism. This starting of the record change cycle is shown in FIG. 6.

The electromagnet 585 has a power source provided by a very small voltage coming off a secondary winding from the coil of motor M. Electromagnet 585 has a wire 590 leading to the motor coil. A wire 594 extends from the electromagnet and connects to a lever 595 formed of a conductive material which is pivotally mounted to the motorboard by an insulated grommet 596 and which has a downturned end 597 positioned in line with the path of travel of a contact wire 598 pivotally mounted at one end to the velocity trip lever 124 and guided in this movement by a pair of downturned tabs 599 and 600 on the motorboard. The contact lever 595 and contact wire 598 are shown out of contact in FIG. 2, but shown in contact in FIG. 6 and, as shown in FIG. 6, the circuit is completed to energize electromagnet 585 and initiate the velocity trip mechanism. The contact wire 598 is grounded to the motorboard through connection to tone arm lever 124.

As shown in FIG. 2, the contact lever 595 is inactive with the downturned flange 597 thereof against a protruding insulating block 610 mounted on the reject slide 362. With the parts positioned as shown in FIG. 2 and with the tone arm intermediate the ends of a record, the contact lever 595 can be swung into contact with the contact wire 598, which energizes electromagnet 585 and initiates the record change cycle. The mechanism for moving the contact lever 595 includes a plate 620 having one end pivoted at 621 to an operating lever 622 pivoted to the motorboard by a pin 623. The plate 620 additionally has a slot 625 coacting with the mounting pin 541 for guiding the movement of the plate. Movement of the plate 620 toward the left, as viewed in FIG. 2, causes counterclockwise pivoting of the contact lever 595 by engagement therebetween by means of an interengaging friction tab 630 carried on the contact lever 595. The operating lever 622 is normally retained in the condition shown in FIG. 3 by an over-center detent spring 631; however, pivoting movement thereof in a clockwise direction, as viewed in FIG. 3, will move the plate 620 and pivot the contact lever 595 to close the circuit for the electromagnet. This setting will be maintained so long as the operating lever 622 is moved toward the right, as viewed in FIG. 3. Depression of the block 550 and operation of the control lever 622 result in determining the beginning and end of a particular passage or band on a record that is to be repeat played.

In order to perform these operations, it is necessary to deactivate the normal size sense mechanism for controlling the return position of the tone arm. This is readily accomplished by locking the set-down lever 204 against movement and specifically by means of a stop rod shown in FIGS. 2, 4, and 6. This stop rod 650 is pivotally fastened at one end to the arm 208 of the set-down lever and is supported within the mounting bracket 555. The free end 651 of this rod is normally at a level beneath a plate 652 on the underside of the lever 553 mounting the block 550 whereby when the mechanism for selecting the beginning of a passage is inactive the rod 650 is free to move back and forth as the set-down lever 204 moves in a cycle. When the block 550 is lowered to the position shown in FIG. 4 for automatic selection of the passage beginning, it will be seen the stop plate 652 is brought into line with the free end 651 of the rod 650, whereby the set-down lever 204 is held against movement.

Operation of the record changer in a reject cycle clears both the beginning and end controls for passage selection. For a reject cycle, the reject slide 362 is moved downwardly, as viewed in FIG. 2, which causes pivoting movement of the return lever 396 as in the manner described in the patent referred to. This return lever has a finger 700 added thereto. As the return lever is pivoted in a reject cycle from the position shown in FIGS. 2 and 6 to the position shown in FIG. 7, finger 700 engages in a loop 701 in a wire 702 connected to a lever 703 pivoted at 704 to the motorboard and which lies adjacent the block 550. Movement of this lever imparts sufficient movement to the block to free the catch engagement with the notch 560 of the block, as will be evident in FIG. 4.

Figure 7:
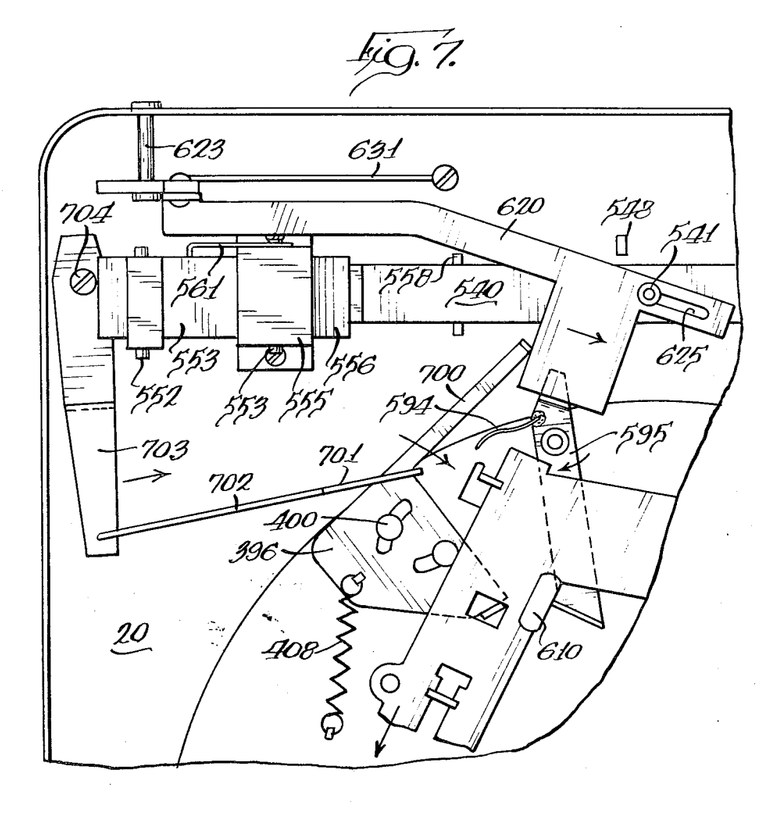
FIG. 7 is a fragmentary view of part of the mechanism shown in FIG. 6 and with the parts in reset position for normal operation of the record player.

As shown in FIG. 7, the finger 700 also engages the plate 620 to restore it to initial position which also swings the contact lever 595 back to a position to engage the insulating block 610.

Figures 4, 5:
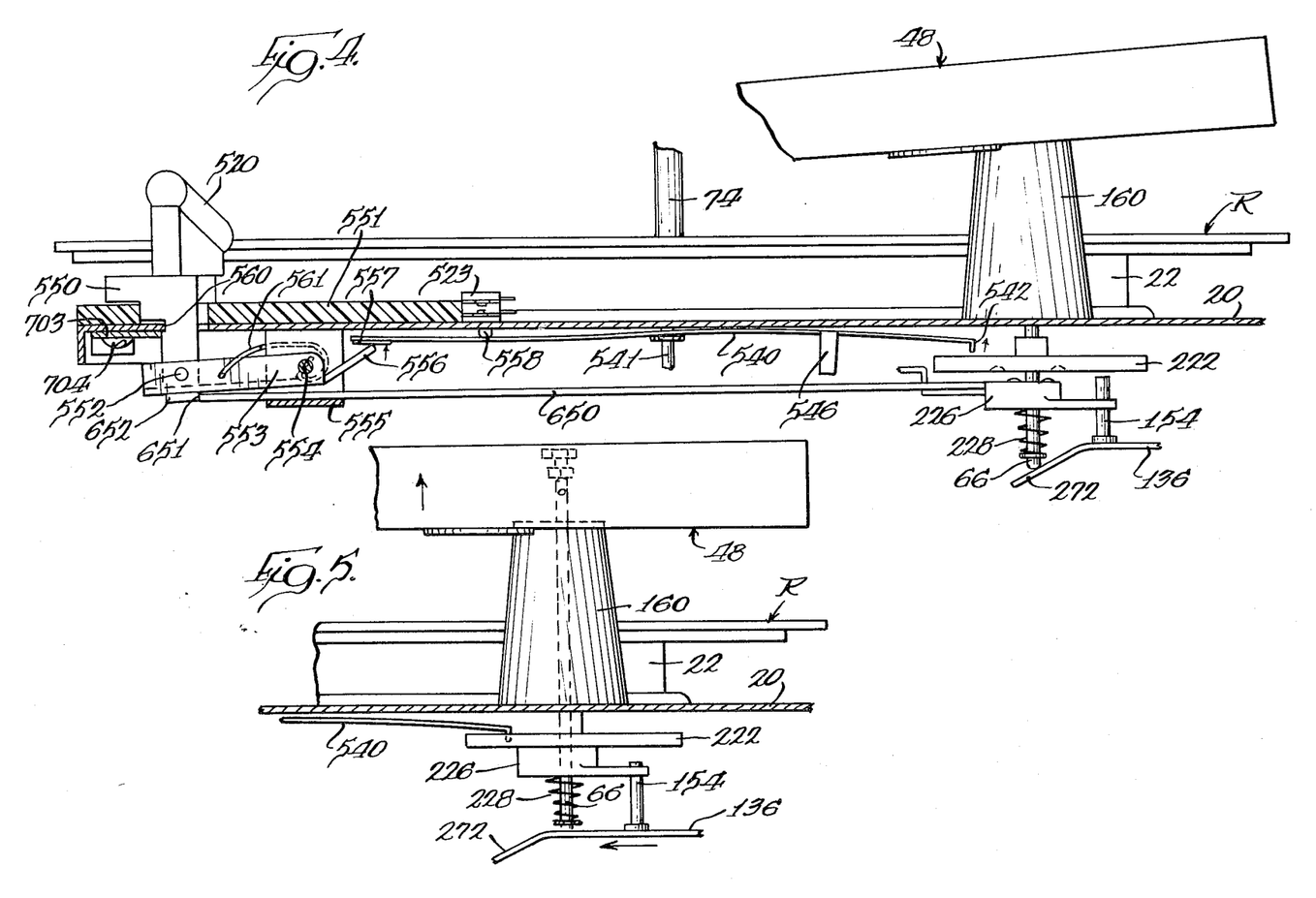
FIG. 4 is a vertical section, on an enlarged scale, taken generally along the line 4—4 in FIG. 2 and showing the passage selection structure in active position.
FIG. 5 is a fragmentary section of the same parts as shown at the right-hand side of FIG. 4, but showing the parts in cycle for selecting the beginning of a record passage.
Figure 8:
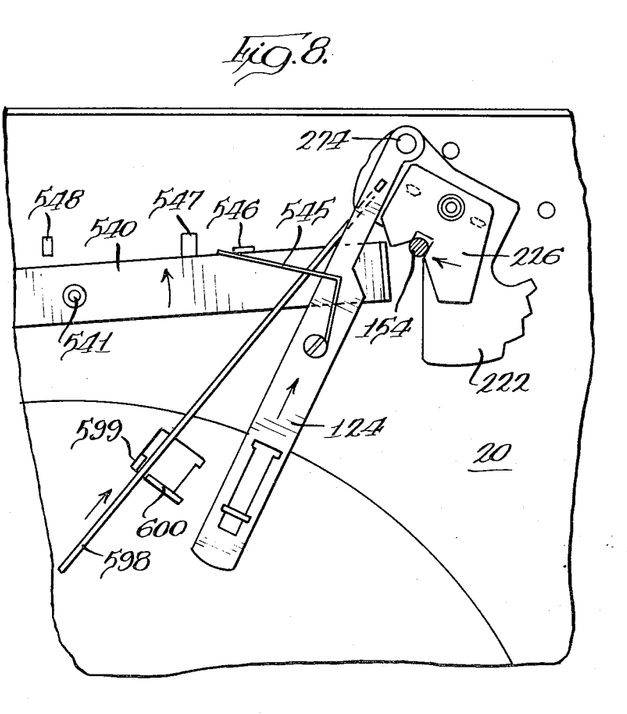
FIG. 8 is a view, similar to FIG. 6, of other parts of the mechanism shown in reset position for normal operation of the record changer.

All of the parts for controlling the beginning and end of a particular passage are shown inactive in FIGS. 2 and 3, while FIGS. 4 and 5 show the mechanism operative to control the beginning of a passage selection and set-down position of the tone arm. FIG. 6 shows the mechanism positioned for not only controlling the set-down position of the tone arm but also at the time when an end-of-passage operation has been determined and the circuit is completed to initiate the reject cycle. FIG. 7 shows the restoration of the beginning and end of passage selection means, while FIG. 8 shows the restoration of the control lever 540 to an initial position.

With the structure disclosed herein, it is possible to provide for manual play of the record on the turntable and to manually operate mechanism to control the set-down position of the tone arm and, further, to select the beginning and end of a particular passage at random on the record. This mechanism continues to operate for a plurality of plays of the particular passage and until such time as a reject operation is initiated by operation of the lever 35.

I claim:

In an automatic record changer having a tone arm, a turntable, and record changer cycle means including means for actuating said record changer cycle means upon completion of play of a record, means for moving said tone arm outwardly beyond said turntable, and set-down means for causing said tone arm to move inwardly to at least one preselected set down position, the improvement comprising: passage selecting means actuable during normal play when said tone arm is at a first desired position for overiding said set-down means to cause said tone arm to move inwardly and be set down at said first desired position after compleation of a change cycle, and end of passage selector means actuable when said tone arm is at a second desired position for initiating operation of said record change cycle means, said end of passage selector means thereafter automatically initiating said record change cycle means at said second desired position.

2. A record changer as defined in claim 1 wherein said record changer includes mechanism providing a last record shut-off cycle wherein the record changer is turned off after the last record on the turntable has been played, and means for incapacitating said last record shut-off cycle mechanism when said passage selecting means is in use.

3. A record changer as defined in claim 1 having reject means for initiating a record change cycle and means responsive to operation of said reject means for deactivating said passage selecting means when said passage selecting means is in use.

4. A record changer as defined in claim 1 wherein said passage selecting means also includes manually operable means for moving said tone arm to the beginning of a desired passage.

5. A record changer having a turntable with a tone arm, means for operating the record changer through a record change cycle including movement of the tone arm outwardly beyond the turntable and back to a position over the turntable, and means for sensing the size of a record to be played to control a set-down position of the tone arm where the tone arm engages a record on the turntable, the improvement comprising: mechanism for selecting the beginning of a desired passage on the record for repeat playing including, means for locking the record size sense means from operating to control the set-down position of the tone arm; and actuable means for establishing a set-down position of the tone arm which is the position of the tone arm when said last-mentioned means is actuated.

6. A record changer as defined in claim 5 including settable means for causing termination of the playing of a record in advance of the normal end of a record.

7. A record changer as defined in claim 6 wherein said record changer includes mechanism for obtaining last record shut-off operation wherein the record changer is turned off after the last record on the turntable has been played, and said means for locking the record size sense means also prevents operation of the last record shut-off mechanism.

8. A record changer having a turntable with a tone arm, a motorboard beneath the turntable, means for operating the record changer through a record change cycle including movement of the tone arm outwardly beyond the turntable and back to a position over the turntable including a set-down cam movable with the tone arm, a control lever pivoted to said motorboard and having a surface engageable with the set-down cam whereby said lever is moved by the tone arm as the latter moves inwardly over the turntable, means for locking said control lever against pivotal movement when the tone arm is in the desired position to start a passage and positioning said surface at an elevation whereby the set-down cam can pass by said surface, and means during a record change cycle for elevating said set-down cam to the same lever as said surface at said elevation whereby the surface and set-down cam can contact to establish a tone arm set-down position followed by lowering of the set-down cam for movement of the set-down cam as the tone arm follows a record groove.

9. A record changer as defined in claim 8 having record size sense mechanism and last record shut-off mechanism including a movable set-down lever, and linkage connected to said set-down lever and held against movement by said locking means to prevent operation of said set-down lever.

* * * * *